Dec. 1, 1931.   P. E. MATTHEWS   1,834,286
AUXILIARY SPRING FOR SHAFT DRIVEN VEHICLES
Filed Jan. 25, 1929
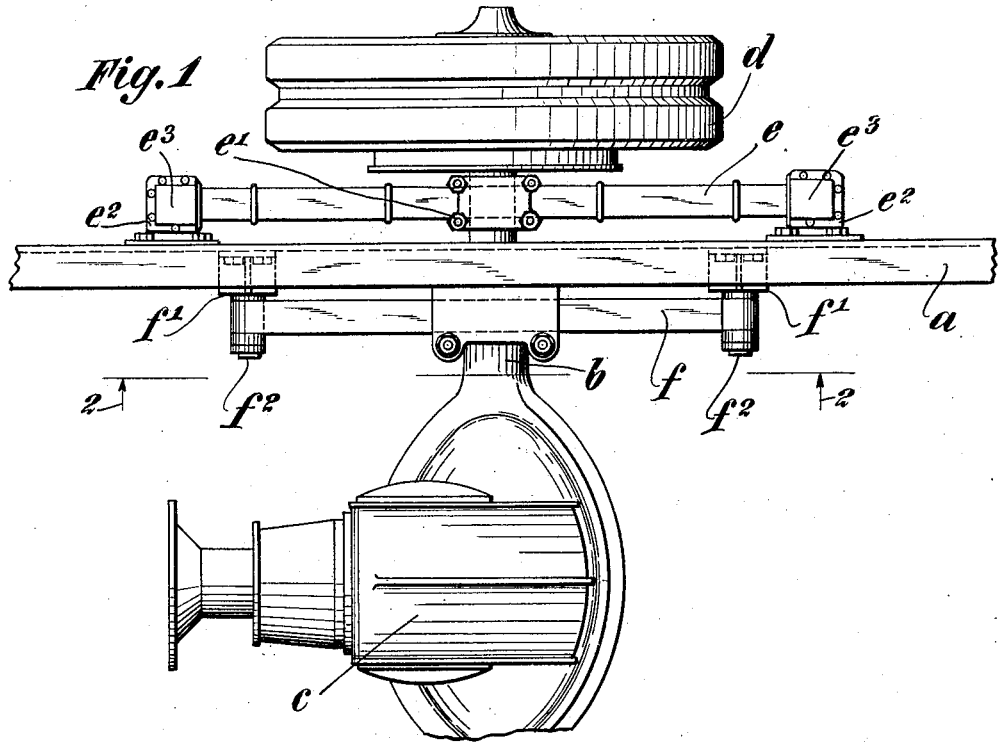
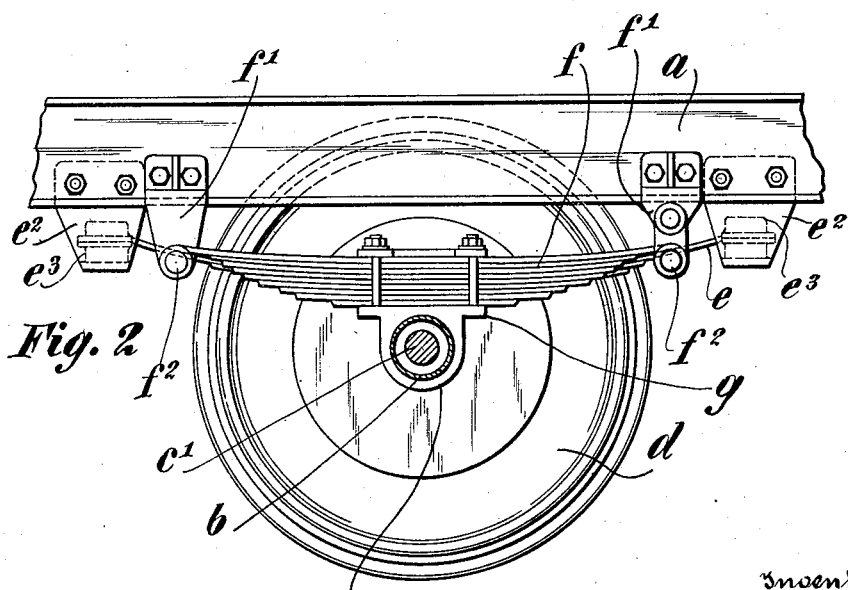
Inventor:
Philip E. Matthews,
By his attorneys
Redding, Greeley, O'Shea & Campbell Patented Dec. 1, 1931

1,834,286

UNITED STATES PATENT OFFICE

PHILIP E. MATTHEWS, OF PLAINFIELD, NEW JERSEY, ASSIGNOR TO INTERNATIONAL MOTOR COMPANY, OF NEW YORK, N. Y., A CORPORATION OF DELAWARE

AUXILIARY SPRING FOR SHAFT DRIVEN VEHICLES

Application filed January 25, 1929. Serial No. 334,895.

The present invention relates to spring constructions for motor vehicles and, more specifically, embodies an improved spring mounting in which the vehicle load is carried by one spring and the torque reaction during acceleration and braking is carried by a second and independent spring.

In the conventional spring construction wherein the frame is mounted upon the driving axle by a single spring at either side of the frame, this spring must not only carry the weight of the body and load, but must also, in many instances, transmit the driving torque between the axle and frame. The twisting forces set up in the spring are highly deleterious to the individual leaves thereof and it is necessary to make the spring considerably larger than would ordinarily be necessary to carry the load most comfortably to result in the best riding qualities. To overcome this difficulty and impart to the spring the ability to carry greater ranges of loads, various helper spring constructions have been designed but they have all included, fundamentally, the carrying by a single spring at either side of the vehicle, all of the stresses, both static and dynamic, which are transmitted between the spring and load.

An object of this invention is to provide a spring construction in which independent spring elements carry the different types of forces to be transmitted between the spring and frame. More specifically, the spring embodies compound spring elements having independent portions for receiving the different types of forces to be transmitted between the spring and frame, one of these elements floating upon the axle and the other element being fixed to the axle.

Further objects of the invention will be apparent as it is described more fully in connection with the accompanying drawings, wherein:

Figure 1 is a plan view, partly broken away, showing the rear of a vehicle chassis provided with a spring construction embodying the invention.

Figure 2 is a view in section, taken on line 2—2 of Figure 1, and looking in the direction of the arrows.

Referring to the above drawings, $a$ designates a vehicle frame carried by an axle $b$ provided with a differential $c$ and live axle section $c'$. A wheel $d$ is carried by the axle to receive the driving forces exerted by the live axle section $c'$.

To support the static load of the frame, body and vehicle load, a spring $e$ is fixed to the axle by bolts $e'$ and mounted, at its ends, in brackets $e^2$ which are carried by the frame. If desired, these brackets may be formed with housings $e^3$ within which blocks of yielding non-metallic material, such as rubber, may be carried to receive the spring ends. In such event, the shocks transmitted between the spring and frame will be cushioned in an obvious manner.

A second spring $f$ is preferably mounted upon the opposite side of the frame member $a$ and secured to the frame member through brackets $f'$ and bolts $f^2$. This spring floats upon the axle $b$ and is received within a housing $g$ upon a bracket $g'$ carried by the axle. It will be seen that the spring $f$ may move within the housing $g$ and thus, during acceleration, the spring $f$ will not receive the driving torque but will tend to move slightly with respect to the axle $b$ and housing $g$. Spring $f$, therefore, carries the static load only, while spring $e$ transmits the driving torque between the axle and frame.

By means of the construction described above, the spring $f$ may be made lighter since it does not have to carry any of the torque transmitted between the axle and frame and the riding qualities of the vehicle will be bettered materially. While the invention has been described in connection with the specific spring mounting described above, and shown in the accompanying drawings, it is not to be limited, save as defined in the appended claims.

I claim as my invention:

1. A spring suspension between an axle and a frame comprising springs upon opposite sides of the frame secured at their ends to the frame, a housing secured to the axle and movably receiving the springs whereby the latter will float upon the axle, a second set of springs upon opposite sides of the frame secured at their ends to the frame, and means to secure the second springs fixedly to the axle to transmit torque between the axle and frame.

2. A spring suspension between an axle and a frame comprising a spring secured at its ends to the frame at one side thereof, a floating connection between the spring and the axle, a second spring secured at its ends to the frame at the same side thereof, and means to secure the second spring fixedly to the axle to transmit torque between the axle and frame.

This specification signed this 11th day of January A. D. 1929.

PHILIP E. MATTHEWS.